(12) United States Patent
Mueller et al.

(10) Patent No.: US 7,685,829 B2
(45) Date of Patent: Mar. 30, 2010

(54) PROCESS AND DEVICE FOR PRODUCING A CURRENT OF HUMID AIR

(75) Inventors: Hans-Juergen Mueller, Bernried (DE); Karl-Heinz Mann, Weilheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 76 days.

(21) Appl. No.: 11/458,782

(22) Filed: Jul. 20, 2006

(65) Prior Publication Data

US 2007/0018344 A1       Jan. 25, 2007

(30) Foreign Application Priority Data

Jul. 21, 2005       (DE)       ........................ 10 2005 034 175

(51) Int. Cl.
*F25D 17/06*       (2006.01)

(52) U.S. Cl. .................... 62/92; 62/93; 62/317; 261/30; 261/117; 261/128; 261/130; 261/140.1; 261/152; 261/DIG. 34; 261/DIG. 65; 236/44 C

(58) Field of Classification Search ...................... 62/92, 62/93, 317; 236/44 C; 261/DIG. 34, DIG. 65, 261/30, 117, 128, 130, 140.1, 152
See application file for complete search history.

(56) References Cited

U.S. PATENT DOCUMENTS

| | | | |
|---|---|---|---|
| 3,226,948 A * | 1/1966 | Alderson et al. ............... | 62/317 |
| 4,269,057 A | 5/1981 | Ong et al. | |
| 4,528,147 A * | 7/1985 | Ilgner et al. .................. | 261/128 |
| 5,231,029 A | 7/1993 | Wootton et al. | |
| 5,394,734 A | 3/1995 | Wenger | |
| 5,669,554 A * | 9/1997 | Nakamura et al. ......... | 236/44 C |
| 5,988,003 A | 11/1999 | Zuk | |
| 6,338,474 B1 * | 1/2002 | Semba ........................ | 261/128 |
| 2002/0139096 A1 | 10/2002 | Brilmaker | |
| 2004/0050866 A1 * | 3/2004 | Ingenhoven et al. ......... | 222/135 |
| 2005/0127540 A1 * | 6/2005 | Han ........................ | 261/119.1 |

FOREIGN PATENT DOCUMENTS

| | | |
|---|---|---|
| DE | 2139236 A1 | 2/1973 |
| DE | 102004028303 A1 | 12/2005 |
| EP | 0345190 A1 | 12/1989 |
| GB | 349355 A | 5/1931 |
| GB | 368961 A | 3/1932 |
| JP | 62087261 A | 4/1987 |

* cited by examiner

*Primary Examiner*—Frantz F Jules
*Assistant Examiner*—Azim Rahim
(74) *Attorney, Agent, or Firm*—Marilyn Amick; Roche Diagnostics Operations, Inc.

(57) ABSTRACT

Process and device for generating a current of humid air having a defined relative humidity comprising the steps of generating a current of air in a tubing arrangement, generating hot water vapor, introducing the water vapor into the air current to generate flowing hot humid air, passing the hot humid air through a water separator while lowering the temperature of the humid air below the dew point temperature to generate saturated humid air having a defined temperature, heating the humid air coming from the water separator above the defined temperature to achieve a defined relative humidity, and discharging the humid air from the tubing arrangement as a current of humid air having a relative humidity of not less than 80%.

8 Claims, 1 Drawing Sheet

PROCESS AND DEVICE FOR PRODUCING A CURRENT OF HUMID AIR

RELATED APPLICATIONS

This application claims priority to German application DE 102005034175.6 filed Jul. 21, 2005.

FIELD OF THE INVENTION

The invention concerns a process for producing and providing a current of humid air and a device for carrying out the process.

BACKGROUND OF THE INVENTION

A variety of air humidifying processes and air humidifying devices known which have different operating principles. Thus for example an air humidifying process is known from U.S. Pat. No. 4,269,087 in which air bubbles through a container that is partially filled with water and is saturated with water vapour in this process. The desired relative humidity is adjusted by admixing dry air wherein a humidity sensor is used to monitor the relative humidity.

Another air humidifying process is known from U.S. Pat. No. 5,660,554 in which air bubbles through a heated bottle that is partially filled with water during which it is saturated with water vapour. At higher air flow rate, the humidification is doubtful because larger air bubbles can be formed in the water whose saturation is no longer ensured. It is difficult to set uniform low working pressure in the range of a few 10 mbar since the pressure of humid air is also influenced by the hydrostatic pressure of the water column in the bottle and there can be large fluctuations in the pressure when the formation of air bubbles is irregular. In such processes in which air is passed through water filled into a container, one usually has to take care to avoid microbial contamination of the water store in the relevant container.

An air humidification process is known from U.S. Pat. No. 5,394,734 in which atomized water is sprayed by means of a nozzle into a space to be humidified. The amount of water to be atomized has to be controlled using a humidity sensor to monitor the relative humidity in the relevant space.

A corrosion chamber where humidity is generated by atomizing water is known from U.S. Pat. No. 5,988,003. In this case it is critical that the temperature and the humidity in the chamber have to be controlled simultaneously and depend on one another. The amount of water to be atomized is controlled which requires a humidity sensor to monitor the humidity.

It is known from U.S. Pat. No. 5,231,029 that humid air of about 95% relative humidity can be used to prevent sample carriers from drying out in an incubator. More details on the generation of the humid air are not given in U.S. Pat. No. 5,231,029.

Humidity generators have also already been proposed in which air bubbles through water in a thermostatic container and is saturated with moisture in this process. The targeted relative humidity below the saturation point is produced by isothermal expansion of the saturated vapour. In such humidity generators it is difficult to set uniform low working pressures in the range of a few 10 mbar since the hydrostatic pressure of the water column that is dependent on the filling height of the water in the container is added to the desired working pressure. Moreover, there is a large fluctuation in the pressure due to irregular formation of air bubble when the water is passed through the water column.

In the previously known humidification processes it is difficult to simultaneously maintain a defined humidity, a defined temperature and a defined pressure or air flow or to adjust these parameter substantially independently of one another. In the humidification processes using humidity sensors there is a problem that the humidity sensors are generally inaccurate at relative humidities above 90% especially when dew forms. Humidification processes in which air is passed through water containers in order to saturate the air with water vapour, have the disadvantage that there is a risk of contamination of the water containers by microbes or algae. When the air flow is higher, larger air bubbles are usually formed in the water whose saturation with moisture cannot be ensured. Moreover, it is difficult to maintain small working pressures for the already mentioned reasons.

SUMMARY OF THE INVENTION

The object of the present invention is to specify a process for generating a current of humid air of defined relative humidity and temperature which can be carried out with simple means and allows a precise adjustment of the humidity even at relative humidities close to the vapour saturation limit of air.

The process according to the invention that is proposed to achieve this object comprises the following steps:
  generating a current of air in a tubing arrangement,
  generating hot water vapour,
  introducing the water vapor into the air current to generate flowing hot humid air,
  passing the hot humid air through a water separator while lowering the temperature of the humid air,
  heating the humid air coming from the water separator to a certain temperature to lower the relative humidity to a defined value, and
  discharging the humid air from the tubing arrangement as a current of humid air.

The current of air is preferably generated using a compressor that sucks in ambient air and conveys it into the tubing arrangement where the delivery rate of the compressor can be controlled in order to regulate the pressure in the tubing arrangement.

Hot water vapour is preferably generated by an evaporator which is continuously supplied with a metered amount of liquid water such that is can generate a continuous and constant stream of hot vapour. The temperature of the evaporator is preferably adjusted to a value that is considerably below 100° C. such that the vapour which is evolves is superheated steam (water in a gaseous state). This superheated steam is preferably conveyed to the tubing arrangement and passed into the current of air as a continuous current, e.g. by means of a nozzle which protrudes into the tubing arrangement. In doing so the air takes up the superheated steam without reaching moisture saturation. The temperature of the air-water vapour mixture increases in this process to about 100° C. The hot current of humid air is then passed to the water separator whose temperature is adjusted such that the current of humid air is cooled below the dew point temperature. The separator removes heat and water from the humid air while forming a condensate such that the relative humidity can increase until the humid air is saturated. The condensate is separated in the water separator. Hence the water separator is preferably used to generate saturated humid air of a defined temperature. The dimensions of the water separator should be such that it can compensate for natural variations in the moisture content of the ambient air that is sucked in. The saturated humid air leaves the water separator and is then heated to a temperature that is above the temperature of the separator in order to adjust the relative humidity to a defined value below the saturation limit. The current of humid air is then discharged from the tubing arrangement and can be used for a specific application such as the mixing treatment of a liquid containing water on a liquid support.

DETAILED DESCRIPTION OF THE INVENTION

Figure 1:
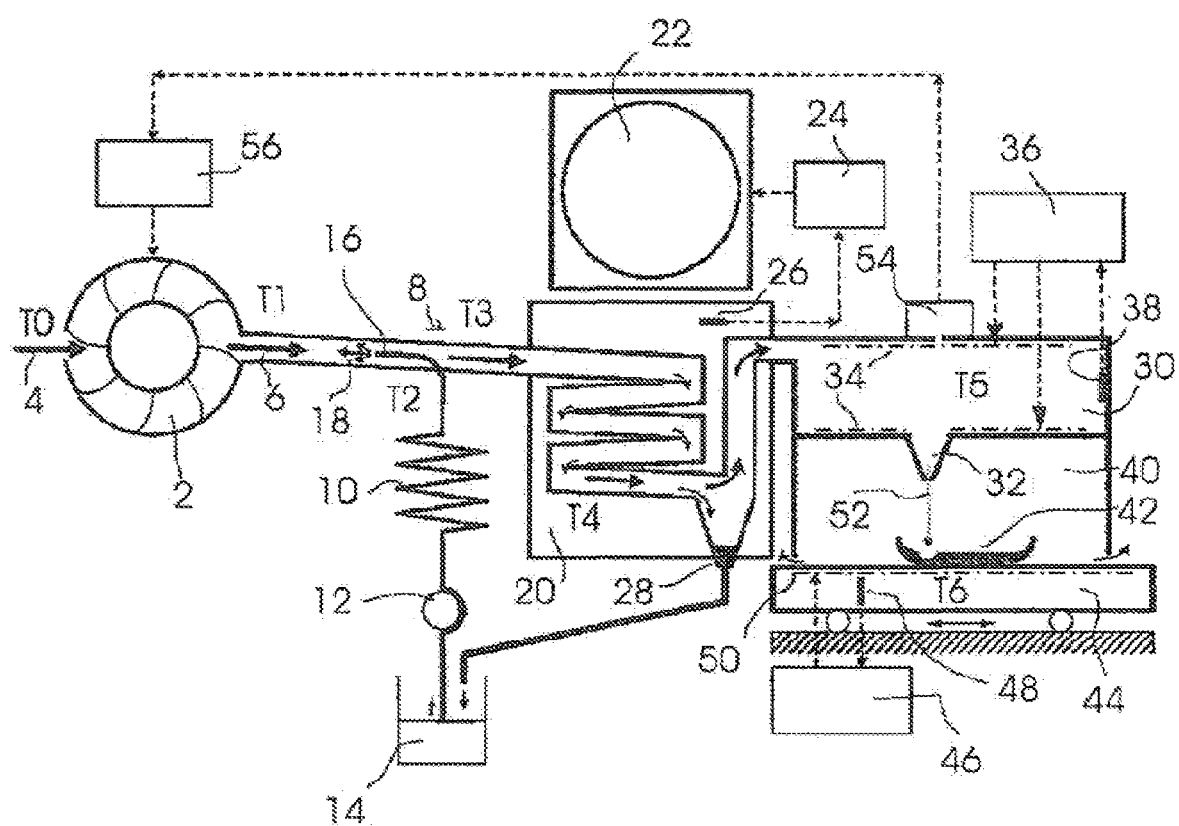
FIG. 1 shows a schematic view of a device for generating a current of humid air according to the invention which can be used to mix an analyte liquid in a biochip. The device according to FIG. 1 comprises a compressor 2 as a source of compressed air which sucks in ambient air 4 of temperature TO and presses it into tube 6 of the tubing arrangement 8 to form a current of air in the tubing arrangement 8.

The present invention has arisen on the basis of considerations on how to overcome problems which occur with such an application case of a mixing treatment of a liquid containing water. Such a specific application case is carrying our a method for detecting analytes in a liquid in which the liquid is subjected to a mixing treatment on a surface of a carrier (biochip) which has an immobilized reactant wherein a jet of air sweeps over at least some areas of the liquid in a scanning manner during the mixing treatment by means of a jet that is directed at the carrier surface. Such a method for detecting analytes and a device for carrying out the method are disclosed in the German Patent Application DE 10 2004 028 303.6 of the applicant. Reference is made to DE 10 2004 028 303.6 and the disclosure of which is incorporated into the present application.

The method that is very suitable for detecting analytes, especially when trough-like biochips with an essentially flat bottom are used as a carrier surface, results in an efficient local mixing of the sample liquid containing the analyte in the zone which is currently being impacted by the air jet. In this process the jet is directed from above onto the sample liquid such that the air jet locally displaces sample liquid in the impact area. This has the effect that the level of sample liquid in the impact area of the air jet is reduced to a very low value of for example only a few μm and that in a zone containing this area with a reduced level of liquid is efficiently homogenized by vortexing. Since the point of impact of the air jet sweeps the carrier surface in a scanning manner, the zone of intensive intermixing of the sample liquid migrates on the bottom of the chip over the carrier surface such that new analytes are supplied in an accelerated manner to the boundary layer which is initially depleted of analyte by previous binding reactions. This increases the probability of further binding reactions between the analytes and the immobilized reactants thus increasing the sensitivity or reducing the incubation time and improving the homogeneity especially the location-independent homogeneity of analyte binding compared to conventional methods. In order to reduce the evaporation of sample liquid in the biochip, the air supplied to the jet is humidified by an air humidification device.

The evaporation of the analyte liquid and also its temperature vary depending on the humidity of the air that is blown in since it is cooled due to the evaporation energy removed from the analyte liquid. Both effects can considerably interfere with the analysis.

The inventor has recognized that very humid air when blown into a particular biochip, considerably reduces the evaporation and reduces the temperature reduction of the analyte liquid but the air does not have to be saturated with moisture since blowing in saturated air into the biochip often results in undesired condensation effects in the biochip and its environment which can also considerably interfere with the analysis.

The process according to the present invention is very suitable for generating a very humid but not yet moisture-saturated jet of air of a predetermined temperature for the mixing treatment of an analyte liquid in a biochip where the temperature of the humid air that is blown in and the temperature of the analyte liquid of the biochip should deviate as little as possible from one another. This can for example be achieved by controlling the temperature of the biochip and the biochip environment according to the temperature of the humid air.

The air current generated by the process of the present invention can in the aforementioned application case of the mixing treatment of an analyte liquid in a biochip be directed onto the biochip by means of a discharge jet. If necessary several jets can be used simultaneously to treat one or more biochips. The relative humidity of the jet of humid air that leaves the nozzle can for example be 95%. Undesired condensation of water from the jet of humid air can be avoided by suitable temperature control of the biochip and the biochip environment. The evaporation of the analyte liquid during the mixing treatment is low and undesired cooling of the analyte liquid is avoided.

The process for producing a stream of humid air according to the invention is, however, not limited to the aforementioned application case of the mixing treatment of a liquid but can be used advantageously for all cases where a precise atmosphere of humid air should be created and maintained such as quite generally in incubator applications.

The feature of discharging a current of humid air from the tubing arrangement should no necessarily mean that the humid air is discharged into the open but is intended to also encompass the case that the current of humid air is discharged into a chamber, connecting tube or such like that directly adjoins the tubing arrangement.

The invention also concerns a device for generating a current of humid air which is suitable for carrying out the process according to the invention and has following features:

a source of compressed air to generate an air current in a tubing arrangement, a source of steam for providing hot water vapour, a mixer for introducing the water vapour into the air current, water separator to cool the humid air coming from the mixer arrangement, and a device for releasing humid air for discharging the humid air from the tubing arrangement wherein the device for releasing humid air has a tube area downstream of the water separator said tube area having temperature adjusting means to heat the humid air in this tube area.

The source of compressed air is preferably a compressor preferably with a controllable discharge capacity for generating compressed air from the ambient air and for passing the compressed air into the tubing arrangement.

The steam source preferably comprises an evaporator with at least one tube coil, a heating device for the tube coil and a water supply device for supplying water to the evaporator in a metered manner.

According to one variant of the invention the water supply device can comprise a water reservoir and a metering pump conveying liquid water from the water reservoir to the evaporator.

The mixer preferably has at least one jet projecting into the path of the air current to blow in superheated water vapour into the air current.

The water separator is preferably a water condenser that can be thermostated and has a drain for the condensed water. When the normally unsaturated humid air coming from the mixer flows through the water condenser, the humid air is cooled down to or below the dew point temperature such that the humid air leaving the condenser is essentially saturated with vapour and has the lowered temperature in the water separator. A thermoelectric heat pump is proposed for controlling the temperature of the water separator.

According to a preferred further development of the invention the device comprises means to adjust the air pressure in the discharge device for humid air. The discharge tube area of the discharge device for humid air has at least one discharge jet for humid air according to a preferred embodiment of the invention which forms an outlet jet of humid air. The discharge tube area is preferably designed as a collecting chamber for humid air in order to realize a "pressure reservoir".

An embodiment example of the invention is further elucidated in the following with reference to FIG. 1.

A water evaporator 10 is used to prepare hot water vapour. In the example the evaporator has an evaporator coil consisting of a coiled channel of 1 mm$^2$ cross-section and about 1500 mm length, the coil diameter being about 20 mm.

The evaporator 10 is continuously supplied with liquid water from the storage container 14 by means of a metered pump 12 which is in the form of a peristaltic pump in the example. The water begins to boil in the evaporator coil and is converted into a mixture of drops and vapour bubbles. The drops are in intensive thermal contact with the wall of the soil due to continuous deflection, they finally completely evaporate and generate a constant current of superheated water vapour i.e. water in a gaseous state at a temperature $T2>100°$ C.

A jet 16 connected to the evaporator 10 injects the hot steam that is supplied as a continuous current into the tube 6 and thus into the air current. The area of the tube 6 in which this occurs is referred to as the mixer 18. The compressed air conveyed by the compressor 2 into the tube 6 at a temperature T1 is increased in temperature to T3 in the mixer 18 where this mix temperature T3 is approximately 100° C. This mix temperature is due especially to the heat of condensation. The humid air which leaves the mixer area at a temperature T3 is preferably unsaturated. It flows into a condensed water separator 20 which is thermally adjusted to a certain temperature T4 by a control unit comprising a thermoelectric heat pump 22, a control device 24 and a temperature sensor 26. In the example the temperature T4 is about 35° C. At this temperature the dew point is reached such that the water separator 20 removes heat from the humid air to form condensate. The tubing walls of the separator consist of good heat-conducting material and have a large inner surface.

Due to the slope of the tubing in the water separator 20 the condensed water flows into a sump 28 at the lowest point of the water separator 20 and from there is led away to the storage container 14. The humid air flowing out of the water separator 20 has a relative humidity of 100% and a temperature T4 of about 35° C. The end of the tubing arrangement 8 forms a "pressure reservoir" in the form of a collecting chamber for humid air 30 which has at least one air outlet jet 32. Electrical heating means 34 e.g. heating foils or such like which are a component of a temperature control device to adjust the temperature of the humid air in the collecting chamber 30 are located on the walls of the collecting chamber 30. This temperature control device also includes the control device 36 and the temperature sensor 38 which monitors the temperature of the humid air in the collecting chamber 30 as an actual value transmitter.

Temperature T5 in the collecting chamber is higher than the temperature T4 of the water separator. The saturated humid air flowing into the collecting chamber is thus heated to T5 where T5 in the example is about 36° C. As a result of the heating of the humid air its relative humidity is lowered (in the example by about 5.6% per ° C.). Thus very moist but unsaturated air is held ready in the collecting chamber for humid air 30 for discharge via the jet 32. The humid air that is discharged by the jet 32 can thus be supplied for a specific use. In the example this is the mixing treatment of an analyte liquid in a biochip 42 that is designed like a trough with a flat bottom. The biochip is located in an incubator space 40 into which the jet 32 discharges.

44 in FIG. 1 denotes a controlled movable base for the biochip 42.

The temperature T6 of the base 44 can be controlled where the control device 46, the actual value transmitter-temperature sensor 48 and the heating device 50 are shown as elements of the temperature control device. Of course a cooling device can also be provided for the temperature control device.

During the mixing treatment of the biochip 42 the temperature T6 is adjusted to a value which is as close as possible to the temperature T5 of the collecting chamber for humid air 30.

The base 44 is moved accordingly to enable the stream of humid air leaving the jet 32 to sweep at least some areas of the liquid surface of the biochip 42 in a scanning manner. Alternatively or in addition the jet 32 can also be moved in order to scan the liquid surface in the biochip 42.

With regard to the humidity adjustment, it should also be taken into account that the isothermal expansion of the humid air at the jet 32 reduces the relative humidity by about 1.2% at 12 mbar.

The pressure in the collecting chamber for humid air 30 is adjusted to a predetermined value of for example 12 mbar by means of a pressure control device. The pressure control device comprises a pressure sensor 54 for monitoring the pressure in the chamber 30, a control device 56 and the compressor 2 as the adjusting element. In the humid air the volume or pressure portion of the air is about 90% and the proportion of water vapour is about 10%. The pressure control compensates for the pressure increase due to the injected hot vapour by conveying a correspondingly reduced amount of air.

The invention enables the generation of a current of air having a defined constant humidity and a certain temperature. In the described application example of the mixing treatment of an analyte liquid in a biochip, the current of air results in a low and reproducible analyte evaporation and a defined, reproducible analyte temperature. In the example the liquid in the biochip is impinged by an air current of about 13 ml/s. The pressure in the collecting chamber for humid air is adjusted to about 12 mbar. The amount of water evaporated per unit of time in the evaporator is about 0.6 µl/s.

A precise adjustment of humidity is possible by adjusting the temperature of the humid air. No humidity sensors are required which is particularly advantageous because humidity sensors operate relatively inaccurately at humidities near to the saturation limit. If the dimensions of the device are suitable, the air flow, temperature and humidity can be varied substantially independently of one another e.g. in case changes in the number of jets or the cross-section of the jets were to be necessary.

The device according to the invention can very rapidly be made ready for start-up and can be rapidly switched off. The air sucked in by the compressor does not have to be pretreated with regard to temperature or humidity. If the temperature is controlled appropriately the generated humidity is free of germs. The humidity generated is substantially maintenance-free. The design allows the inner area to be rapidly dried after use. All temperature controlled components can be heated to facilitate drying.

What is claimed is:

1. A device for generating a current of humid air, the device comprising:
   a source of compressed air to generate an air current in a tubing arrangement,
   a source of steam for providing hot water vapor,
   a mixer for introducing the water vapor into the air current,
   a water separator comprising a water condenser that can be thermostated to cool the humid air coming from the mixer to below a dew point temperature to generate saturated humid air having a defined temperature,
   a discharger for discharging the humid air, the discharger comprising a tube area downstream of the water separator, the tube area having a temperature adjusting apparatus adapted to heat the humid air coming from the water separator to above the defined temperature to achieve a relative humidity of not less that 80% in the discharged humid air, and
   a pressure control apparatus which comprises at least one pressure sensor for registering the pressure in the tube area and an adjuster for influencing a supply of compressed air from the compressed air source in accordance with a deviation of an actual pressure from a target pressure in the tube area.

2. The device of claim 1 wherein the source of compressed air comprises a compressor for generating compressed air from ambient air and for passing the compressed air into the tubing arrangement.

3. The device of claim 1 wherein the source of steam comprises an evaporator with at least one tube coil and a heating apparatus for the tube coil as well as a water supply apparatus for supplying water to the evaporator.

4. The device of claim 3 wherein the water supply apparatus comprises a water reservoir and a metering pump that conveys liquid water from the water reservoir to the evaporator.

5. The device of claim 1 wherein the mixer comprises at least one jet projecting into the path of the air current to blow water vapor into the air current.

6. The device of claim 1 wherein a thermoelectric heat pump is allocated to the water separator for temperature control.

7. The device of claim 1 further comprising a pressure adjusting apparatus for adjusting pressure of the humid air in the discharger.

8. The device of claim 1 wherein the tube area comprises a collecting chamber provided with or connected to at least one outlet jet for humid air.

* * * * *